N. C. BUTLER.
MEASURING DEVICE.
APPLICATION FILED JUNE 2, 1916.
1,345,071.
Patented June 29, 1920.
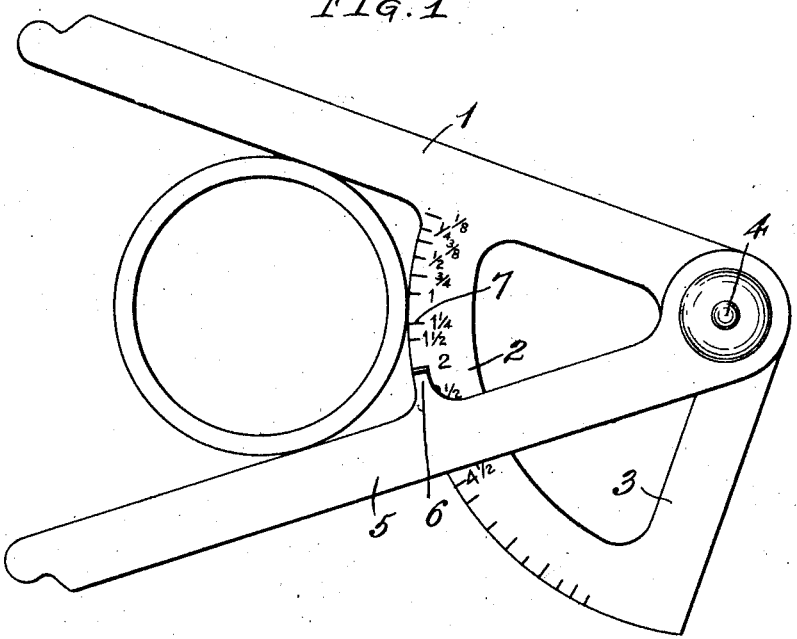
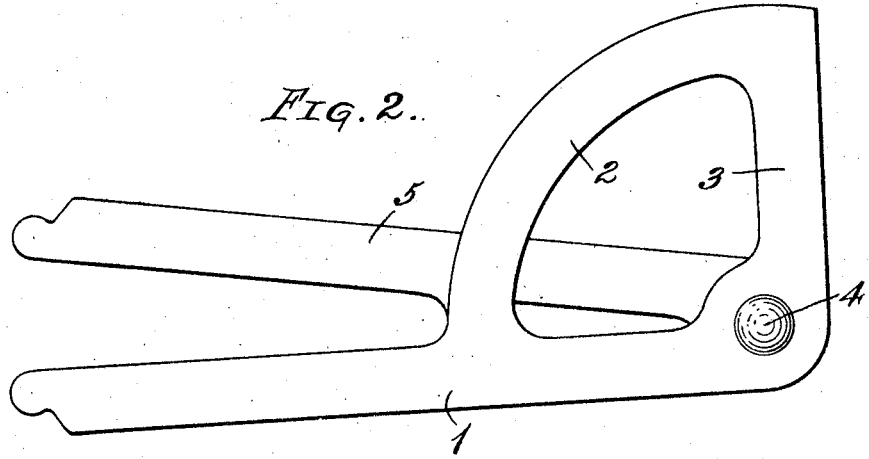
Inventor.
Nathan C Butler
By Brockett and Hyde,
Att'ys.

UNITED STATES PATENT OFFICE.

NATHAN C. BUTLER, OF CLEVELAND, OHIO.

MEASURING DEVICE.

1,345,071. Specification of Letters Patent. Patented June 29, 1920.

Application filed June 2, 1916. Serial No. 101,310.

*To all whom it may concern:*

Be it known that I, NATHAN C. BUTLER, citizen of the United States, residing at Cleveland, in the county of Cuyahoga and State of Ohio, have invented certain new and useful Improvements in Measuring Devices, of which the following is a specification.

This invention relates generally speaking to measuring devices and particularly to gages for use in measuring and indicating the diameters of pipes.

More specifically the invention relates to a gage comprising preferably a pair of pivoted members one of which is provided with a segment having graduations, the pivoted members and the segment operating to measure and indicate the size of pipe by the engagement of the two pivoted members and the segment with the outer wall, these three portions furnishing three points of contact. Suitable indications are provided upon the segment for the various sizes.

The invention may be further briefly summarized as consisting in the construction and combination of parts hereinafter set forth in the following drawings, description and claims.

Referring to the drawings Figure 1 is a view showing one side of the device with the graduations on the segment, and Fig. 2 is a view of the back of the instrument.

In the embodiment shown 1 represents the main arm which is substantially straight and is provided with a sector portion made up of the arc shaped member 2 and the right angular extending portion 3. Pivoted to this arm by a pin or rivet 4 is a second arm 5 having an index point 6 adapted to coöperate with the graduations 7 on the arc shaped portion 2 to indicate the various sizes of the articles measured.

The device is used by spreading the arms 1 and 5 sufficiently to receive the pipe or other article and it is forced toward such article until the latter engages the arc shaped portion 2 when the pipe or other article will contact at three points, at one point on each of the arms 7 and one point on the periphery of the arc shaped portion. The index point 6 will then register with the proper graduation upon the arc shaped portion. It is obvious from the foregoing that the size and diameter of the pipe is determined by making a contact with it at three points, a line connecting any two of such points being less than the diameter of the pipe or article measured.

Having described my invention, I claim:

1. A gage for measuring round articles, comprising a pair of members adjustably connected to assume various angular relations with each other and adapted to receive an article between them, one of said members having a fixed stop for limiting entrance of the article into position between said members, one of said members having graduations thereon, and a portion of the other member coöperating with said graduations as an indicator, said graduations being properly spaced and identified to indicate by the position of the indicator thereon the diameter of an article lying between and contacting both of said members and the stop.

2. A gage for measuring round articles, comprising a pair of members pivotally connected so as to assume various angular relations with each other, said members having inner straight edges which intersect the axis of said pivot, one of said members being provided with a fixed stop for limiting entrance of an article into position between said members, said members being respectively provided with a scale and with an index for indicating the diameter of an article lying between said members in contact with the inner straight edges thereof and with said stop.

In testimony whereof I affix my signature in presence of two witnesses as follows.

NATHAN C. BUTLER.

Witnesses:
 ELBERT L. HYDE,
 D. TOZER.